United States Patent [19]

Yagi et al.

[11] Patent Number: 5,671,015
[45] Date of Patent: Sep. 23, 1997

[54] SIGNAL PROCESSING APPARATUS

[75] Inventors: Osamu Yagi; Kenji Tanaka, both of Tokyo, Japan

[73] Assignee: Sony Corporation, Tokyo, Japan

[21] Appl. No.: 982,969

[22] Filed: Nov. 30, 1992

[30] Foreign Application Priority Data

Dec. 12, 1991 [JP] Japan .................. 3-328714

[51] Int. Cl.$^6$ .................. H04N 5/217; H04N 5/235; H04N 5/238; H04N 5/16
[52] U.S. Cl. .................. 348/241; 348/229; 348/257; 348/363
[58] Field of Search .................. 358/209, 228, 358/213.27, 167, 174, 177; 348/207, 222, 229, 241, 257, 363, 362

[56] References Cited

U.S. PATENT DOCUMENTS

| | | | |
|---|---|---|---|
| 4,525,741 | 6/1985 | Chahal et al. | 358/212 |
| 4,979,043 | 12/1990 | Suzuki et al. | 358/167 |
| 5,008,757 | 4/1991 | Kimura et al. | 358/213.13 |
| 5,043,812 | 8/1991 | Citta et al. | 348/434 |
| 5,311,311 | 5/1994 | Harigai et al. | 348/476 |

FOREIGN PATENT DOCUMENTS

| | | | |
|---|---|---|---|
| 0 342 708 | 11/1989 | European Pat. Off. | H04N 5/238 |
| 0 400 605 | 12/1990 | European Pat. Off. | H04N 5/235 |
| 0 446 647 | 9/1991 | European Pat. Off. | H04N 5/232 |
| 0 473 966 | 3/1992 | European Pat. Off. | H04N 3/15 |

OTHER PUBLICATIONS

Prior art shown in FIG. 1 and 2 of the disclosure.
Patent Abstracts of Japan, vol. 14, No. 259 (E-937) 5 Jun. 1990 & JP-A-20 78 382 (Hitachi Ltd) 19 Mar. 1990.
Patent Abstracts of Japan, vol. 14, No. 105 (E-895) 26 Feb. 1990 & JP-A-13 05 672 (NEC Corp.) 8 Dec. 1989.

*Primary Examiner*—Leo Boudreau
*Assistant Examiner*—Bipin Shalwala
*Attorney, Agent, or Firm*—William S. Frommer; Alvin Sinderbrand

[57] ABSTRACT

A signal processing apparatus includes a first loop circuit for adjusting gains of a plurality of variable gain amplifiers to which signals output from a charge-coupled device (CCD) imager of multiple-channel reading type are applied, a control circuit for driving and controlling an iris in accordance with output signals from the plurality of variable gain amplifiers, a second loop circuit for adjusting levels of pilot signals to be superimposed upon the output signals of the CCD imager at a desired level, respectively, a third loop circuit for controlling levels of the pilot signals which are superimposed upon the output signals of the CCD imager so as to be coincident with each other, and a control unit for controlling the first loop circuit and the control circuit, the second loop circuit, and the third loop circuit so that they are operated in a time-division fashion.

12 Claims, 4 Drawing Sheets

SIGNAL PROCESSING APPARATUS

BACKGROUND OF THE INVENTION

1. Field of the Invention

The present invention relates to a signal processing apparatus for use with a video camera having a CCD (charge-coupled device) or charge transfer device imager having multiple channel outputs.

2. Description of the Prior Art

When a signal is processed in conventional video cameras having a CCD imager which derives multiple channel outputs, a signal processing such as a sample and hold (S/H) processing, an automatic gain control (AGC) processing or the like is effected in a parallel fashion, which unavoidably causes a mismatching in the parallel channels to occur.

A technique is proposed that a pilot signal P that was superimposed upon an output signal M of the CCD imager is detected in the later stage of the parallel processing and used as a feedback signal to thereby cancel a mismatching in the parallel channels, as shown in FIG. 1 of the accompanying drawings.

FIG. 2 of the accompanying drawings shows in block form a circuit that realizes the above technique. As shown in FIG. 2, output signals from horizontal registers 3, 5 of a CCD imager (2 channels in this example) 1 are respectively supplied to sample and hold) circuits 7, 9 whose output signals are respectively supplied to variable gain amplifiers or automatic gain control amplifiers (AGCs) 11, 13.

Output signals of the automatic gain control amplifiers 11, 13 are supplied to a signal processor circuit 15 and detector circuits 17, 19 of the succeeding stage. The signal processor circuit 15 processes the output signals of the automatic gain control amplifiers 11, 13 in a predetermined signal processing fashion, and the detector circuits 17, 19 detect the levels of the output signals of the automatic gain control amplifiers 11. 13.

An output signal of the detector circuit 17 is compared with a reference level a by a comparator 21 and a signal representative of a compared level is fedback to the automatic gain control amplifiers 11, 13.

An output signal of the detector circuit 19 is supplied to a buffer 23 and a comparator 25. An output developed at an inverting terminal of the buffer 23 is supplied to the automatic gain control amplifier 13 and an output developed at the non-inverting terminal thereof is supplied to the automatic gain control amplifier 11.

The input signal is compared with a reference level b by the comparator 25 and a compared value is fedback to the horizontal registers 3, 5.

The output signals of the sample and hold circuits 7, 9 are supplied to a detector circuit 27, in which they are detected in level. An output signal of the detector circuit 27 is supplied to and compared with a reference level c by a comparator 29. A compared output from the comparator 29 is used to control an iris I of a video camera (not shown).

The above circuit arrangement, however, needs a loop circuit for matching absolute values of the pilot signals (because the levels of the output signals from the variable amplifiers 11, 13 are changed) and a second loop for matching the levels of pilot signals in the original parallel channels. The first and second loop circuits present multiple loop circuits for the iris I and the AGC loop. As a consequence, time constant and response of the loop cannot be set substantially. There is then the risk that a mismatching in the parallel channels cannot be absorbed (i.e., canceled) properly.

OBJECTS AND SUMMARY OF THE INVENTION

Therefore, it is an object of the present invention to provide a signal processing apparatus for a video camera having a CCD imager with multi-channel outputs in which the aforementioned shortcomings and disadvantages of the prior art can be eliminated.

More specifically, it is an object of the present invention to provide a signal processing apparatus for a video camera having a CCD imager with multi-channel outputs which can cancel a mismatching in the parallel mutual channels while the respective loop circuits are not operated in the same time interval.

According to an aspect of the present invention, there is provided a signal processing apparatus which comprises a first loop circuit for adjusting gains of a plurality of variable gain amplifiers to which signals output from a charge-coupled device (CCD) imager of multi-channel reading type are applied, a control circuit for driving and controlling an iris in accordance with output signals from the plurality of variable gain amplifiers, a second loop circuit for adjusting levels of pilot signals to be superimposed upon the output signals of the CCD imager at a desired level, respectively, a third loop circuit for controlling levels of the pilot signals which are superimposed upon the output signals of the CCD imager so as to be coincident with each other, and a control unit for controlling the first loop circuit and the control circuit, the second loop circuit, and the third loop circuit so that they are operated in a time-division fashion.

According to this invention, since the first loop circuit and the control circuit for controlling the iris, the second loop circuit, and the third loop circuit are controlled so that they are operated in a time division fashion, the first to third loop circuits are not operated in the same time interval. Therefore, the present invention brings the advantage in actual practice that the mismatching in the parallel channels of the CCD imager can be canceled.

The preceding and other objects, features, and advantages of the preset invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

Figure 1:
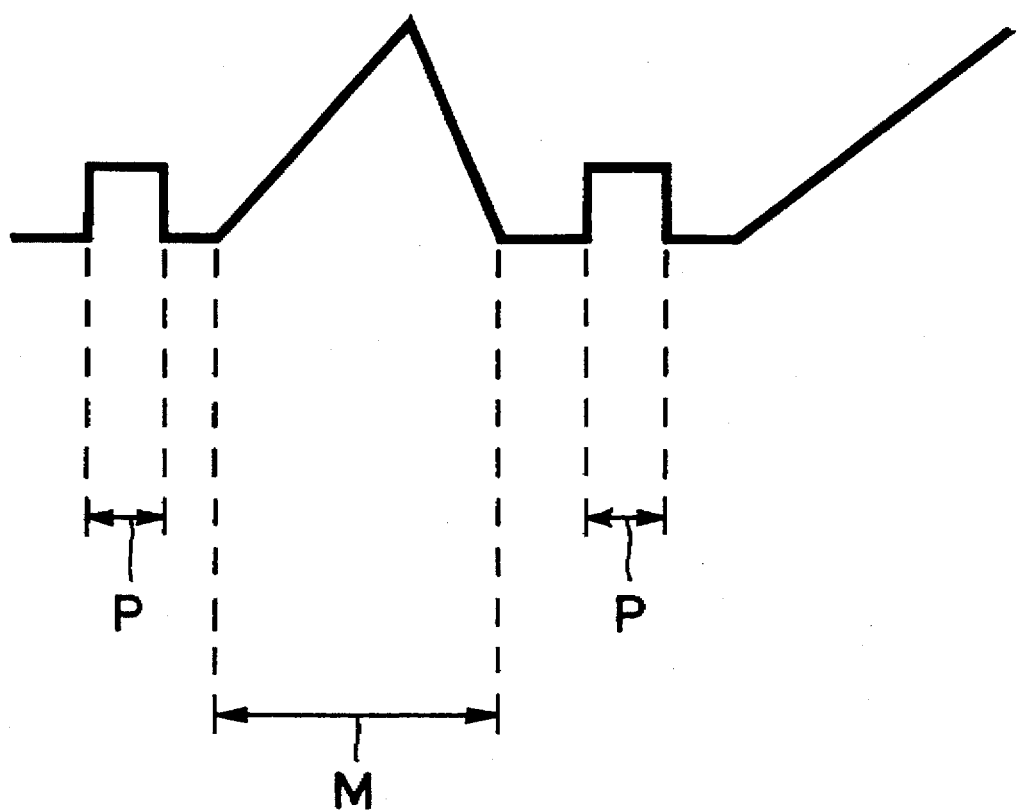
FIG. 1 is a diagram of waveforms of a pilot signal and an output signal of a CCD imager and to which references will be made in explaining the present invention.
Figure 2:
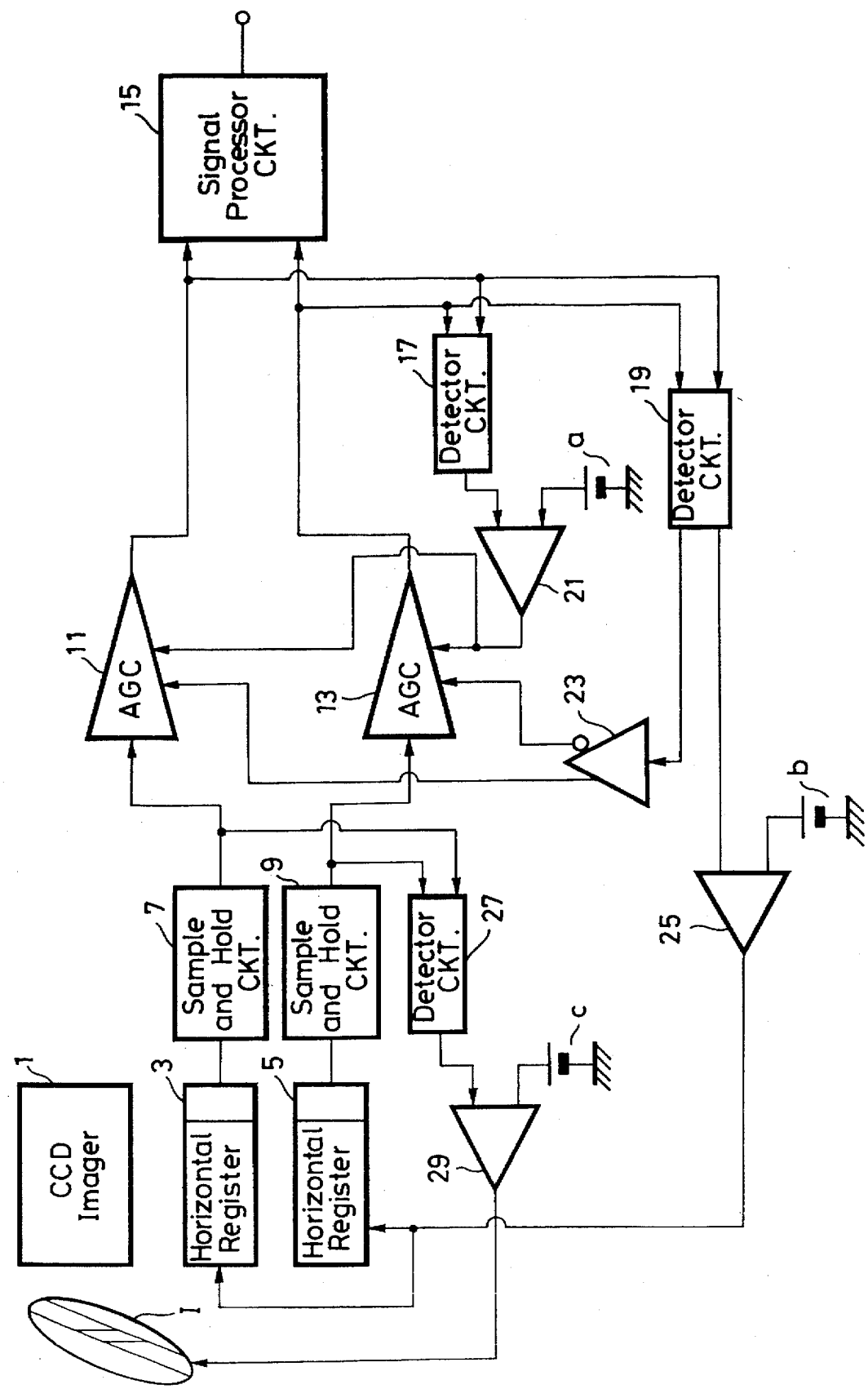
FIG. 2 is a block diagram showing a conventional signal processing apparatus.
Figure 3:
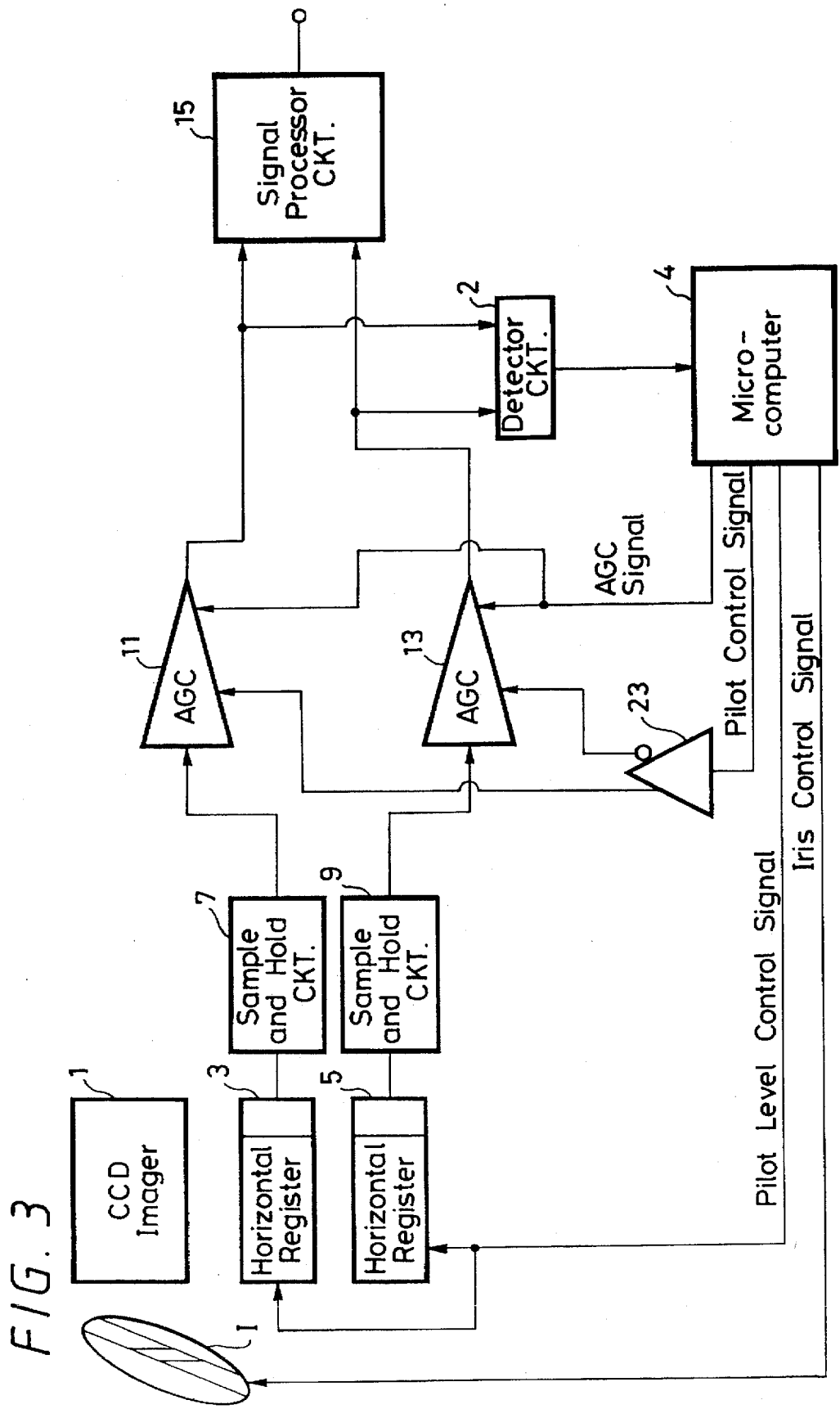
FIG. 3 is a block diagram showing a signal processing apparatus according to an embodiment of the present invention.

A signal processing apparatus according to an embodiment of the present invention will now be described with reference to the drawings. In FIG. 3, parts and elements identical to those of FIG. 2 are marked with the same references and therefore need not be described.

As shown in FIG. 3, the output signals of the automatic gain control amplifiers 11, 13 are supplied to a detector circuit 2, in which the levels thereof are detected. Signals representative of the detected levels are supplied to a microcomputer 4.

The microcomputer 4 controls the automatic gain control amplifiers 11, 13 on the basis of the signal input from the detector 2. A loop formed of the automatic gain control amplifier 11 (automatic gain control amplifier 13), the detector circuit 2 and the microcomputer 4, in that order, constructs a first loop circuit.

A loop formed of the automatic gain control amplifier 11 (automatic gain control amplifier 13), the detector circuit 2, the microcomputer 4 and the buffer 23, in that order, constructs a third loop circuit. A loop formed of the horizontal register 3 (horizontal register 5), the automatic gain control amplifier 11 (automatic gain control amplifier 13), the detector circuit 2 and the microcomputer 4, in that order, constructs a second loop circuit. The iris I is driven under the control of the microcomputer 4.

The second loop circuit operates to match the absolute values (pilot levels) of the pilot signals, which are superimposed upon the output signals of the horizontal registers 3, 5, with a desired level. The third loop circuit operates to hold the pilot signals in the parallel channels at substantially the same level (i.e., pilot signal control operation).

Figure 4:
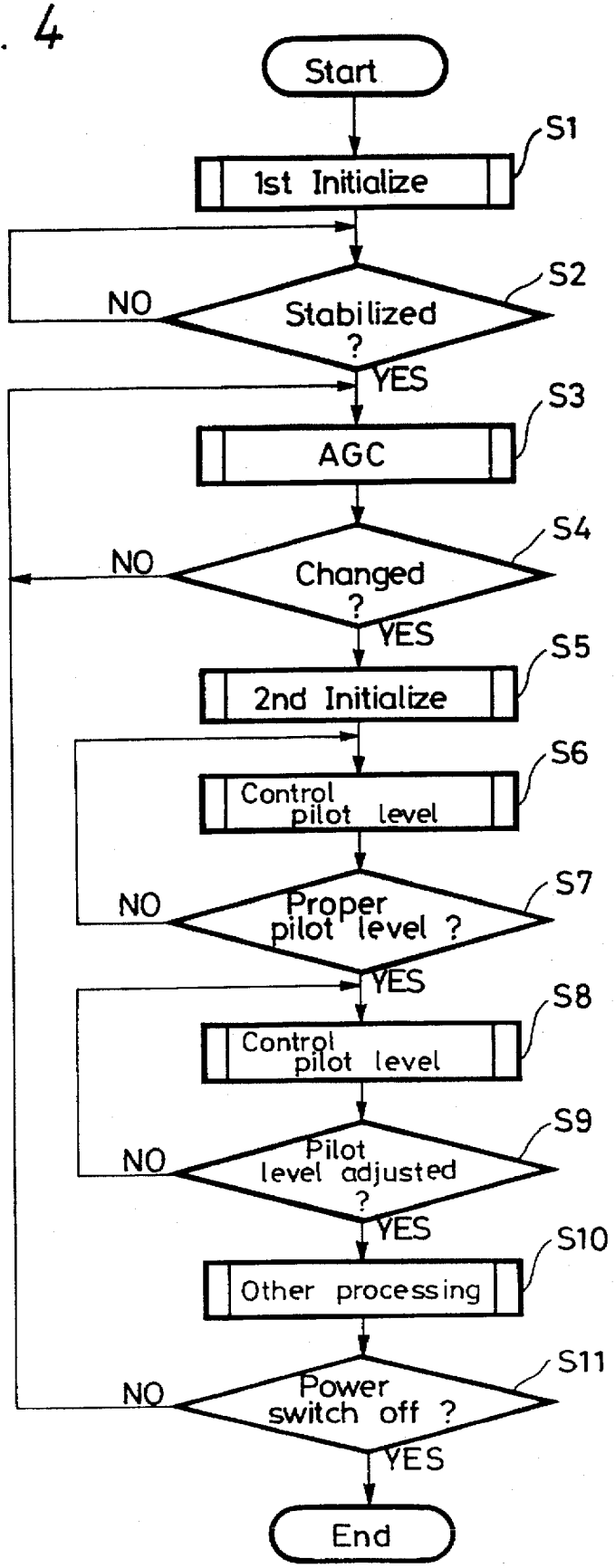
FIG. 4 is a flowchart to which references will be made in explaining operation of the embodiment of the present invention.

A processing procedure that the microcomputer 4 executes will be described with reference to the flowchart of FIG. 4.

When the microcomputer 4 is powered and activated, the first initialization is executed at step S1. In the first initialization, the iris I is closed, the outputs of the variable gain amplifiers 11, 13 are set to minimum values, the gain of the pilot signals is set to a minimum value, and the respective level of the pilot signal in the parallel channels in the CCD imager is set to zero. After this setting mode, the optimum opening amount of the iris I and optimum output values of the automatic gain control amplifiers 11, 13 are detected and stabilized. In decision step S2, it is determined by the microcomputer 4 on the basis of a timer (not shown) or the level change of AGC voltage whether or not the iris I and the automatic gain control amplifiers 11, 13 are stabilized. If a YES is output at decision step S2, then the processing proceeds to the next step S3, whereat the ordinary AGC control operation is carried out. Then, the processing proceeds to the next decision step S4. It is determined in decision step S4 whether or not the AGC voltage is changed. If the AGC voltage is changed as represented by a YES at decision step S4, then the processing proceeds to step S5. Further, this process is executed during a vertical blanking period.

Then, the levels of the automatic gain control amplifiers 11 and 13 are controlled and locked at the controlled levels in step S5, whereat the second initialization is executed. In step S6, the desired or suitable level of the pilot signal which is within a dynamic (D) range is calculated on the basis of the output signal of the detector 2 at this time point.

In the second loop circuit, the number of the second loop control is decreased so as to match the most significant bit (MSB). The second loop control is executed in a horizontal blanking period.

If it is determined that the calculated level is suitable one as represented by a YES at decision step S7, then the processing proceeds to step S8.

In step S8, a difference B between levels of the pilot signals are detected and the third loop control or pilot control is executed so that the pilot signals superimposed on the output signals of the horizontal registers 3 and 5 are held at substantially the same level in the parallel channels.

The third loop control is executed in a horizontal blanking period and in accordance with up/down of the least significant bit (LSB).

If it is determined that the levels of the pilot signals are made coincident each other as represented by a YES at decision step S9, then the processing proceeds to step S10.

In step S10, other processing is executed. Then, it is determined in decision step S11 whether or not the microcomputer 4 is disabled. If it is determined that the microcomputer 4 is not disabled as represented by a NO at decision step S11, then the processing returns to step S3. If it is determined that the microcomputer 4 is disabled as represented by a YES, then the processing is ended automatically.

The processing at steps S3 to S10 is executed in a period of time shorter than one vertical blanking period. When the processing at step 10 is ended, new data or signals are output from the iris I and the automatic gain control amplifiers 11 and 13, so that in the next vertical blanking period both the pilot level control and the pilot control are performed at steps S3 to S10 when the outputs of the automatic gain control amplifiers 11 and 13 are changed considerably.

In other processing at step S10, both the second and third loop circuits for the pilot level control and the pilot control are locked but the first loop circuit for AGC is placed in an unlocked state.

As described above, in accordance with the embodiment of the present invention, since both the second and third loop circuits for the pilot level control and the pilot control are controlled so as to be operated in a time division fashion together with the first loop circuit for the AGC and the control of the iris I, the first to third loop circuits are not operated in the same time interval. Therefore, the mismatching in the parallel channels can be canceled.

As described above, according to the signal processing apparatus of the present invention, since the first loop circuit and the control circuit, the second loop circuit and the third loop circuit are operated in a time division fashion, the first, second and third loop circuits are not operated in the same time interval. There is then the advantage in practice such that the mismatching in the parallel channels of the CCD imager can be canceled out.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A signal processing circuit for processing output signals from a CCD (charge-coupled device) imager of a multiple read-out type having horizontal and vertical blanking periods for receiving light signals from an iris and on which respective pilot signals are superimposed, comprising:

a plurality of variable gain amplifiers for receiving said output signals from said CCD imager to produce respective amplified signals;

a first loop circuit operable to adjust respective gains of said plurality of variable gain amplifiers;

an iris control circuit operable to control said iris on the basis of said amplified signals;

a second loop circuit operable at least once during each horizontal blanking period of said CCD image to similarly adjust said respective pilot signals at a desired level;

a third loop circuit operable at least once during each horizontal blanking period of said CCD imager to equalize the levels of said respective pilot signals; and control means for controlling said first loop circuit, said iris control circuit, said second loop circuit, and said third loop circuit to operate during respective different time intervals in a predetermined cycle, said predetermined cycle being repeated at least once during each vertical blanking period of said CCD imager.

2. The signal processing circuit according to claim 1, wherein said first and second loop circuits include a detector circuit and a microcomputer.

3. The signal processing circuit according to claim 2, wherein said third loop circuit includes said detector circuit, said microcomputer and a buffer.

4. The signal processing circuit according to claim 2, wherein said second loop circuit includes a plurality of horizontal shift registers of said CCD imager.

5. The signal processing circuit according to claim 3, wherein said iris driving control circuit includes said detector circuit and said microcomputer.

6. The signal processing circuit according to claim 3, wherein said first, second and third loop circuits are operated in a time division manner in the order of said first, second and third loop circuits.

7. A camera, comprising:

an iris;

a CCD (charge-coupled device) imager of a multiple read-out type having horizontal and vertical blanking periods for receiving light signals from said iris and for superimposing respective pilot signals on said light signals;

a plurality of variable gain amplifiers for receiving output signals from said CCD imager to produce respective amplified signals;

a first loop circuit operable to adjust respective gains of said plurality of variable gain amplifiers;

an iris control circuit operable to control said iris on the basis of said amplified signals;

a second loop circuit operable at least once during each horizontal blanking period of said CCD imager to similarly adjust said respective pilot signals at a desired level;

a third loop circuit operable at least once during each horizontal blanking period of said CCD imager to equalize the levels of said respective pilot signals; and control means for controlling said first loop circuit, said iris control circuit, said second loop circuit, and said third loop circuit to operate during respective different time intervals in a predetermined cycle, said predetermined cycle being repeated at least once during each vertical blanking period of said CCD imager.

8. The camera of claim 7, wherein said first and second loop circuits include a detector circuit and a microcomputer.

9. The camera of claim 8, wherein said CCD imager includes horizontal shift registers, and said second loop circuit includes a plurality of said horizontal shift registers of the CCD imager.

10. The camera of claim 8, wherein said third loop circuit includes said detector circuit, said microcomputer, and a buffer.

11. The camera of claim 9, wherein said iris control circuit includes said detector circuit and said microcomputer.

12. The camera of claim 9, wherein said first, second, and third loop circuits operate in a time division manner in the order of said first, second, and third loop circuits.

* * * * *